US007873876B2

(12) United States Patent
Oh

(10) Patent No.: US 7,873,876 B2
(45) Date of Patent: Jan. 18, 2011

(54) IMAGE FORMING DEVICE TO PERFORM A SYSTEM DIAGNOSIS AND METHOD THEREOF

(75) Inventor: Hung-joon Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 11/954,691

(22) Filed: Dec. 12, 2007

(65) Prior Publication Data

US 2008/0162993 A1 Jul. 3, 2008

(30) Foreign Application Priority Data

Dec. 27, 2006 (KR) ............................ 2006-135530

(51) Int. Cl.
*G06F 11/00* (2006.01)

(52) U.S. Cl. ............................ 714/46; 714/25; 714/26; 399/8; 399/11; 399/18

(58) Field of Classification Search .................... 399/8, 399/11, 18; 714/25, 26, 46
See application file for complete search history.

(56) References Cited

U.S. PATENT DOCUMENTS 3,707,725 A * 12/1972 Dellheim .................... 714/38
4,206,995 A * 6/1980 Legg .......................... 399/11
4,937,864 A * 6/1990 Caseiras et al. ............... 714/38
5,218,406 A * 6/1993 Ebner .......................... 399/11
5,412,452 A * 5/1995 Rego et al. .................... 399/11
5,613,115 A * 3/1997 Gihl et al. ................... 717/123
5,794,237 A * 8/1998 Gore, Jr. ............................ 1/1
6,032,001 A * 2/2000 Miyawaki ...................... 399/8
6,085,244 A * 7/2000 Wookey ..................... 709/224
6,321,192 B1 * 11/2001 Houchin et al. ................ 704/9
6,400,462 B1 * 6/2002 Hille ......................... 358/1.14
6,466,748 B2 * 10/2002 Tamai et al. .................. 399/16
6,509,914 B1 * 1/2003 Babula et al. ............... 715/762
6,550,055 B1 * 4/2003 Cohen et al. ................ 717/124
6,571,236 B1 * 5/2003 Ruppelt ............................ 1/1
6,665,425 B1 * 12/2003 Sampath et al. ............. 382/112
6,694,235 B2 * 2/2004 Akiyama ..................... 701/33
6,782,345 B1 * 8/2004 Siegel et al. ................ 702/183
6,826,512 B2 * 11/2004 Dara-Abrams et al. ...... 702/183
6,885,469 B1 * 4/2005 Tanimoto .................. 358/1.14
6,985,676 B2 * 1/2006 Barrett .......................... 399/9
7,257,514 B2 * 8/2007 Faihe ......................... 702/183
7,308,492 B2 * 12/2007 Konopka et al. ............ 709/221
7,373,554 B2 * 5/2008 Chandrasekaran ........... 714/38
7,580,906 B2 * 8/2009 Faihe .......................... 706/14
7,698,242 B2 * 4/2010 Van Camp et al. ............ 706/45
2002/0138234 A1 * 9/2002 Mikal et al. ................. 702/183
2003/0059221 A1 * 3/2003 Funahashi ...................... 399/8
2003/0187878 A1 * 10/2003 Sandifer .................. 707/104.1

(Continued)

*Primary Examiner*—Robert Beausoliel
*Assistant Examiner*—Joshua P Lottich
(74) *Attorney, Agent, or Firm*—Stanzione & Kim, LLP

(57) ABSTRACT

An image forming device which enables a user to determine a diagnostic item and to perform a system diagnosis easily. The image forming device includes a storage unit to store information corresponding to diagnostic items and keyword information for the respective diagnostic items, an input unit to receive an input of at least one input device, and a control unit to search for information corresponding to a diagnostic item stored in the storage unit which corresponds to the at least one input keyword if the at least one keyword is inputted, and performing a system diagnosis of the image forming device.

20 Claims, 5 Drawing Sheets

U.S. PATENT DOCUMENTS

| | | | | |
|---|---|---|---|---|
| 2004/0049490 | A1 * | 3/2004 | Milov | 707/1 |
| 2004/0107088 | A1 * | 6/2004 | Budzinski | 704/10 |
| 2005/0097396 | A1 * | 5/2005 | Wood | 714/25 |
| 2006/0101074 | A1 * | 5/2006 | Cancilla et al. | 707/104.1 |
| 2008/0034351 | A1 * | 2/2008 | Pugh et al. | 717/128 |
| 2008/0091983 | A1 * | 4/2008 | Boss et al. | 714/48 |
| 2008/0270309 | A1 * | 10/2008 | Brotman et al. | 705/52 |

* cited by examiner

| DIAGNOSTIC ITEM | KEYWORD 1 | KEYWORD 2 | KEYWORD 3 |
|---|---|---|---|
| RESIDUAL QUANTITY OF TONER | TONER | RESIDUAL QUANTITY | REPLACEMENT |
| TONER CHARACTERISTIC | TONER | CHARACTERISTIC | GENUINE |
| RESIDUAL QUANTITY OF PAPER | PAPER | RESIDUAL QUANTITY | SUPPLEMENT |
| TIME INFORMATION | TIME | TIME | TIME |
| PRINTING SPEED | PRINT | SPEED | TIME |
| ⋮ | ⋮ | ⋮ | ⋮ |

IMAGE FORMING DEVICE TO PERFORM A SYSTEM DIAGNOSIS AND METHOD THEREOF

CROSS-REFERENCE TO RELATED APPLICATIONS

This application claims priority under 35 U.S.C. §119 (a) from Korean Patent Application No. 10-2006-0135530, filed on Dec. 27, 2006, in the Korean Intellectual Property Office, the entire disclosure of which is hereby incorporated by reference.

BACKGROUND OF THE INVENTION

1. Field of the Invention

The present general inventive concept relates to an image forming device to perform a system diagnosis and a method thereof. More particularly, the present general inventive concept relates to an image forming device to perform a system diagnosis and a method thereof, which determines diagnostic items using at least one keyword and performs a system diagnosis with respect to the determined diagnostic items.

2. Description of the Related Art

With the development of electronic technology, diverse kinds of computer peripheral devices have been developed and popularized. Among them, the representative device is an image forming device such as a printer, a copy machine, a facsimile, and a multifunction device. Such an image forming device has been widely used not only in offices but also at home.

Recently, in order to meet user's requests, diverse functions have been gradually developed and applied to the image forming device. Accordingly, there has been a need for a method capable of diagnosing whether an image forming device is operating normally, what function an image forming device is running, and so forth.

In order to meet such a need, a system for checking the function and operation state of an image forming device by executing a diagnostic program on a host PC has been used. This system is called a remote diagnostic system.

In order to operate a remote diagnostic system, a user should execute a diagnosis program through a host device, directly select items to be diagnosed, and then input a diagnostic command. Accordingly, the host device transmits a diagnostic command to the image forming device, and the image forming device makes a diagnosis of the selected diagnostic items.

However, the conventional remote diagnostic system has drawbacks in that the user should recognize how to use the diagnostic program and grasp which items are to be diagnosed. Accordingly, it is not easy for the user to use the remote diagnostic system.

In particular, in the case where other items related to the item to be diagnosed exist, there is no way to diagnose such items at the same time unless the items are searched for and manually selected one by one.

SUMMARY OF THE INVENTION

The present general inventive concept provides an image forming device to perform a system diagnosis and a method thereof, which enable a user to easily perform a thorough system diagnosis by searching for diagnostic items using a keyword.

Additional aspects and utilities of the present general inventive concept will be set forth in part in the description which follows and, in part, will be obvious from the description, or may be learned by practice of the general inventive concept.

The foregoing and other aspects and utilities of the general inventive concept may be achieved by providing an image forming device which includes a storage unit to store information corresponding to diagnostic items and keyword information corresponding to the respective diagnostic items, an input unit to receive an input of at least one keyword, and a control unit to search for the at least one diagnostic item stored in the storage unit which corresponds to the input of the at least one keyword and performing at least one diagnosis of the image forming device according to the searched at least one diagnostic item.

The input unit may also include a user interface unit to receive an input of the at least one keyword wherein the control unit searches for the at least one diagnostic item stored in the storage unit which corresponds to the at least one keyword inputted through the user interface unit and performs the at least one diagnosis according to the at least one searched diagnostic item.

The input unit may also include an interface unit for receiving the at least one keyword transmitted from an external host device wherein the control unit searches for the at least one diagnostic item stored in the storage unit which corresponds to the at least one keyword transmitted through the interface unit and performs the at least one diagnosis according to the at least one searched diagnostic item.

The control unit may transmit a result of the at least one diagnosis to the external host device through the interface unit if the at least one diagnosis according to the at least one diagnostic item is completed.

The image forming device according to embodiments of the present general inventive concept may further include an engine part to perform an image forming operation where the control unit may perform the at least one diagnosis by performing a self-test of the engine part and checking a result of the self-test if the at least one diagnostic item corresponding to the at least one input keyword relates to an image forming operation.

The image forming device according to embodiments of the present general inventive concept may further include a system data storage unit to store system data where the control unit may perform the at least one diagnosis by checking the system data stored in the system data storage unit if the at least one diagnostic item corresponding to the at least input keyword relates to a characteristic of the image forming device.

The image forming device according to embodiments of the present general inventive concept may further include an output unit to output a message to report the result of the at least one diagnosis, and an engine part to perform an image forming operation and to output a printed document wherein the control unit outputs the result of the at least one diagnosis through at least one of the output unit and the engine part in the form of a message or a printed document if the at least one diagnosis according to the at least one diagnostic item is completed.

The control unit may match information corresponding to the at least one diagnostic item for which a keyword is to be set with set keyword information corresponding to the keyword to be set and store the set keyword information corresponding to the at least one diagnostic item matched with the keyword to be set in the storage unit.

The control unit may search for all diagnostic items having the same keyword as the at least one input keyword among the diagnostic items stored in the storage unit if the keyword is inputted and perform a diagnosis for each diagnostic item associated with the at least one input keyword.

The keyword information stored in the storage unit may be metadata for at least one respective diagnostic item, and the metadata may be editable.

The foregoing and/or other aspects and utilities of the present general inventive concept may also be achieved by providing a system diagnosis method for an image forming device which includes receiving an input of at least one keyword, searching pre-stored information for at least one diagnostic item that corresponds to the at least one input keyword, and performing at least one diagnosis of the image forming device according to the searched pre-stored information for the at least one diagnostic item.

The performing of the at least one diagnosis includes performing a self-test of an engine part of the image forming device to perform an image forming operation if the searched diagnostic item relates to the image forming operation if the at least one searched diagnostic item relates to the image forming operation and checking a result of the self-test.

The performing of the at least one diagnosis includes confirming pre-stored system data if the at least one searched diagnostic item relates to a characteristic of the image forming device.

The system diagnosis method according to embodiments of the present general inventive concept may further include outputting a result of the at least one diagnosis in the form of a printed document or a message if the at least one diagnosis is completed.

The system diagnosis method according to embodiments of the present general inventive concept may further include transmitting a result of the at least one diagnosis to an external host device if the at least one diagnosis is completed.

The system diagnosis method according to embodiments of the present general inventive concept may further include matching information corresponding to at least one diagnostic item for which at least one keyword is to be set with keyword set information corresponding to the at least one keyword to be set and storing the keyword set information corresponding to the at least one diagnostic item matched.

The searching of the pre-stored information for at least one diagnostic item may include searching for all the diagnostic items having the same keyword as the input keyword among the pre-stored information for at least one diagnostic item and the performing at least diagnosis includes, if all the diagnostic items have been searched for, performing the at least one diagnosis corresponding to the at least one searched diagnostic item.

The searching of the pre-stored information may include searching for all the diagnostic items having the same keyword as the input keyword among the pre-stored information for at least one diagnostic item and, if all the diagnostic items have been searched for, the performing of the at least one diagnosis may include providing a list of all the searched diagnostic items and performing at least one diagnosis corresponding to each diagnostic item selected from the list.

In the system diagnosis method according to embodiments of the present general inventive concept, the pre-stored information may be editable metadata for the respective diagnostic items.

The receiving an input of at least one keyword may include receiving the at least one keyword from at least one of an input device provided in the image forming device and an external host device.

The foregoing and/or other aspects and utilities of the present general inventive concept may also be achieved by providing an image forming device, including a storage unit to store information including one or more diagnostic items and one or more keywords to designate each of the at least one diagnostic items, and a control unit to select at least one of the one or more diagnostic items according to an input of at least one of the one or more keywords to perform a diagnosis corresponding to the selected at least one diagnostic item.

The foregoing and/or other aspects and utilities of the present general inventive concept may also be achieved by providing an image forming device, including a storage unit to store information including a diagnostic item and at least two keywords to designate the diagnostic item, and a control unit to perform a diagnosis corresponding to the diagnostic item according to any one of the at least two keywords.

The foregoing and/or other aspects and utilities of the present general inventive concept may also be achieved by providing an image forming device, including a storage unit to store information including a first diagnostic item, a second diagnostic item, a plurality of keywords to designate the first diagnostic item, and a single keyword to designate the second diagnostic item, and a control unit to perform a diagnosis corresponding to the first diagnostic item according to any one of the keywords and to perform another diagnosis corresponding to the second diagnostic item according to a single keyword.

At least one of the keywords may be the same as the single keyword.

The control unit may perform the diagnosis and the another diagnosis according to the single keyword.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
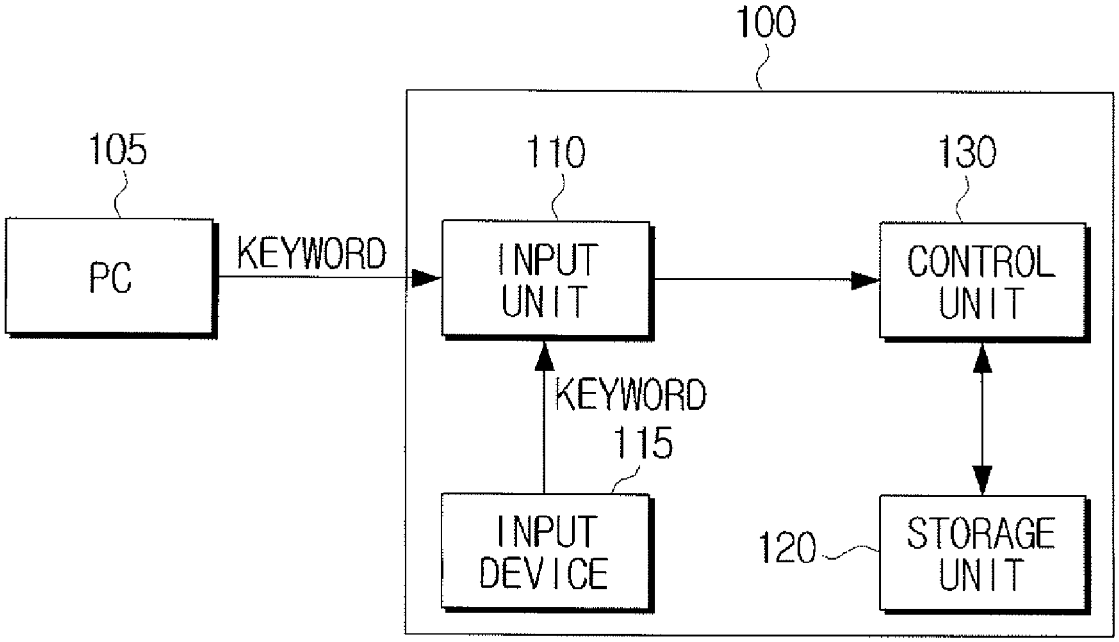
FIG. 1 is a block diagram illustrating the configuration of an image forming device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating the configuration of an image forming device according to an embodiment of the present general inventive concept.

Referring to FIG. 1, the image forming device 100 according to an embodiment of the present general inventive concept includes an input unit 110, a storage unit 120, and a control unit 130.

The input unit 110 serves to receive a keyword. The input unit 110 may receive keyword information input from a user or an external host device such as a PC 105, or may receive a keyword from a user through a keypad 115 or any input device provided in a main body of the image forming device 100.

The storage unit 120 stores diagnostic item information and keyword information. The keyword information may be stored in the form of metadata associated with the diagnostic item information. Accordingly, a user can edit the keyword as the user desires.

If the keyword is inputted through the input unit 110, the control unit 130 receives the input keyword and searches the storage unit 120 for the diagnostic item(s) corresponding to the input keyword, and performs a system diagnosis of the searched diagnostic item(s). A variety of diagnostic items may exist in storage unit 120. For example, a residual quantity of toner, a toner characteristic, a residual quantity of printing paper, time information, system information, printing speed, time for replacing print components, state of picture quality deterioration, and so forth, may be provided in storage unit 120 as stored diagnostic items.

Figures 3, 4:
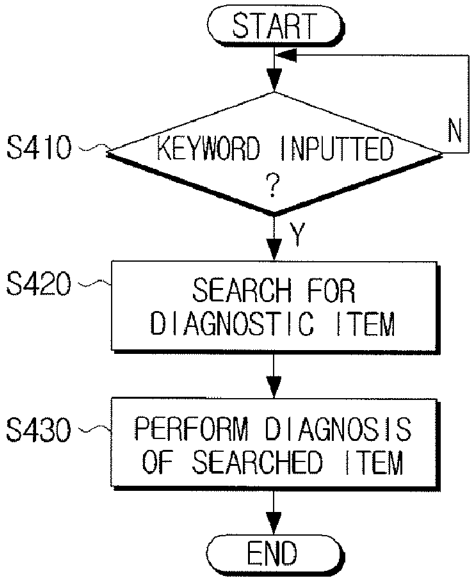
FIG. 3 is a schematic view illustrating an example of diagnostic item information and corresponding keyword information.
FIG. 4 is a flowchart illustrating a system diagnosis method according to an embodiment of the present general inventive concept.

Referring to FIG. 3, a user may set in advance one or more keywords to be associated with each diagnostic item, or one or more keywords to be associated with more than one diagnostic item, and thus the user can directly and flexibly diagnose desired diagnostic items through a simple keyword input. In particular, if the same keyword is set with respect to several diagnostic items, the several diagnostic items can be selected and diagnosed at the same time through the input of only one keyword, thus saving time. To set a keyword, control unit 130 matches information input by a user which corresponds to at least one diagnostic item for which a keyword is to be set with set keyword information corresponding to the set keyword and stores this set keyword information which is associated with the at least one diagnostic item in storage unit 120.

Figure 2:
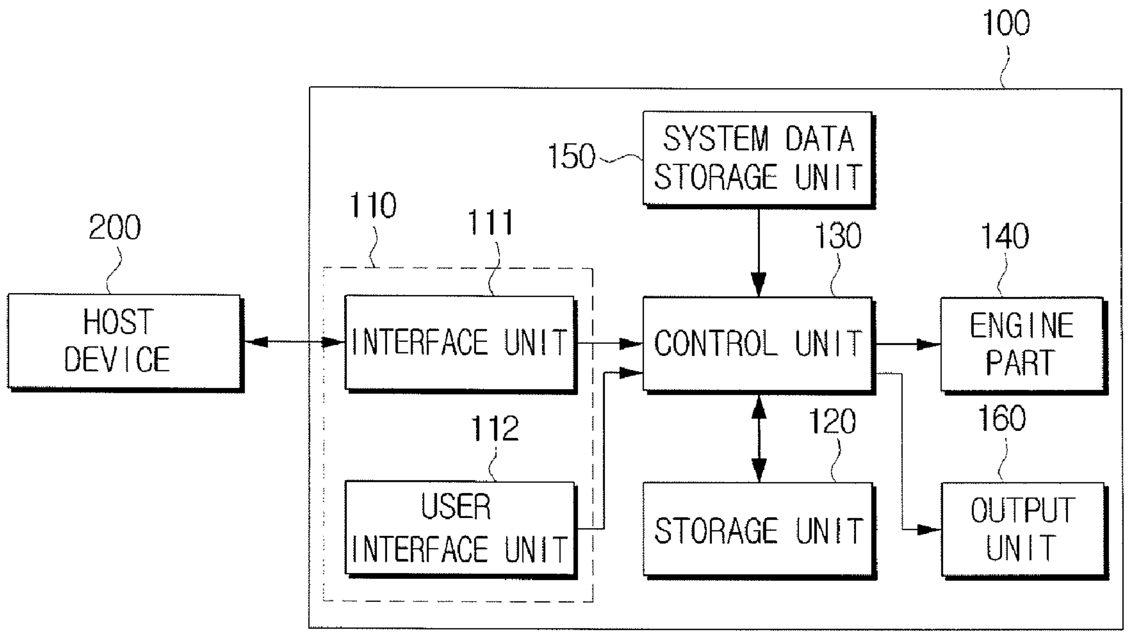
FIG. 2 is a block diagram illustrating the operation of an image forming device according to another embodiment of the present general inventive concept.

FIG. 2 is a block diagram illustrating the operation of an image forming device 100 according to another embodiment of the present general inventive concept.

Referring to FIG. 2, the image forming device 100 is connected to an external host device 200. The image forming device 100 includes an input unit 110, a storage unit 120, a control unit 130, an engine part 140, a system data storage unit 150, and an output unit 160, all being configured as illustrated.

The input unit 110 includes an interface unit 111 and a user interface unit 112.

The interface unit 111 is connected to the external host device 200 locally or via a network. Accordingly, various kinds of commands and data can be transmitted and received between the interface unit 111 and the external host device 200.

The user interface unit 112 receives various kinds of selection commands through the image forming device 100. Specifically, the user interface unit 112 may be implemented by an input device 115 which may be a key button, a touchpad, a touch screen, and so forth.

The storage unit 120 stores information corresponding to a plurality of diagnostic items and corresponding keyword information. As described above, the keyword information may be stored in the form of editable metadata. Accordingly, if new keyword information and diagnostic item information are inputted through the input unit 110 from an external source such as the external host device 200, they can be used to update the pre-stored keyword information associated with a diagnostic item or can be stored in the storage unit 120 as additional keyword information for a respective diagnostic term.

As described above, the user can input the keyword to the interface unit 111 of the input unit 110 through the external host device 200, or can input the keyword through the input device 115 of the user interface unit 112 provided on the image forming device 100.

When the keyword is inputted by the user through the interface unit 111 or the user interface unit 112, the control unit 130 searches the storage unit 120 for at least one diagnostic item corresponding to the input keyword. In one embodiment, if a plurality of diagnostic items are associated with the same keyword, a search is performed for all the associated diagnostic items. The control unit 130 matches information corresponding with each inputted keyword with information corresponding to at least one stored diagnostic item and performs a diagnosis for all such matched diagnostic items.

The control unit 130 performs at least one diagnosis according to the searched diagnostic item(s). If the diagnostic item(s) relates to the operation of the image forming device 100 itself, i.e., an image forming operation, the control unit 130 performs a testing of the engine part 140 to test the image forming operation. The testing of the engine part 140 may be a self-test of the engine part 140.

That is, in this self-test example, the control unit 130 provides test data to an engine controller (not illustrated) of the engine part 140 to control the operation to form an image. In this process, the control unit determines whether constituent elements corresponding to the diagnostic item in the engine part 140 operate normally. For example, if the diagnostic item relates to "fuser performance", the control unit 130 confirms whether the heating temperature of a fuser heating roller (not illustrated), the pressure of the fuser press roller (not illustrated), and so forth, reach proper levels. If they reach proper levels, the control unit determines that the fuser is performing normally, while if not, the control unit 130 determines that the fuser (not illustrated) has malfunctioned.

If a searched diagnostic item relates to a characteristic of the image forming device 100, the control unit 130 checks system data stored in the system data storage unit 150. That is, for example, if the diagnostic item relates to "time information" set in the image forming device 100, the control unit 130 checks the present time stored in the system data storage unit 150. The searched diagnostic item may not be an actual image forming operation of printing an image on a printing medium. However, it is possible that the searched diagnostic item may relate to the actual image forming operation.

The control unit 130 may provide the result of a diagnosis for the diagnostic item to the user in diverse ways. For example, the control unit 130 can control the engine part 140 to print the results of a diagnosis for the respective diagnostic items on a printing paper. In this case, the control unit 130 converts the results of the diagnosis for the respective diagnostic items into bitmap data according to a preset format, and provides the converted bitmap data to the engine part 140, so that the engine part 140 causes the results of diagnosis to be printed via a printer (not illustrated).

In addition, the control unit 130 may transmit the results of the diagnosis to the external host device 200 through the interface unit 111. In this case, the control unit 130 converts the results of the diagnosis for the respective diagnostic items into data packets, and transmits the data packets to the external host device 200.

In addition, the control unit 130 may output the results of the diagnosis for the respective diagnostic items in the form of a message through the output unit 160. The output unit 160 may be implemented as a loud-speaker, a liquid crystal display (LCD) panel, a cathode ray tube (CRT) monitor, an organic LED (OLED) panel, and so forth. Accordingly, the control unit 130 converts the results of a diagnosis for the respective diagnostic items into a visible message or an audible message, and outputs the message through the loudspeaker or the LCD panel, etc. In this embodiment, the output unit 160 and the user interface unit 112 may be formed in a single unit, such as a touch screen and so forth.

In FIG. 2, it is illustrated that the image forming device 100 includes the engine part 140, the system data storage unit 150, and the output unit 160. However, one or more of these may be omitted or modified in another embodiment of the present general inventive concept.

FIG. 3 is a schematic view illustrating an example of information stored in the storage unit 120, i.e., diagnostic item information and keyword information.

Referring to FIG. 3, a wide variety of diagnostic items may be stored. For example, a residual quantity of toner, a toner characteristic, a residual quantity of printing paper, time information, printing speed, and so forth, may be stored as diagnostic items. In this embodiment, three keywords are recorded for each associated diagnostic item. In other embodiments, the number of keywords for each associated diagnostic item is not limited to three.

When any one of the keywords, for example "toner", "residual quantity", or "replacement", is input as the keyword a diagnostic for the corresponding diagnostic item, for example "residual quantity of toner", is performed. When a keyword corresponding to toner is input, a diagnosis for the corresponding diagnostic items, for example "residual quantity of toner" and "toner characteristic" are performed.

Referring to FIGS. 1 through 3, the operation of the image forming device 100 according to an embodiment of the present general inventive concept will now be described in more detail.

The user can input a keyword by executing an application for the system diagnosis through the external host device 200. If the application is executed, a user interface window for the keyword input is generated and displayed on a display screen of the external host device 200 or the touch screen of input device 115. The user may directly input a keyword that may relate to a desired diagnostic item using the user interface window.

For example, if the user desires to check whether the presently mounted toner is genuine, the user may input a keyword "toner". Accordingly, the host device 200 or input device 115 transmits data to control unit 130 to report that the input keyword relates to "toner".

If it is recognized that "toner" has been inputted through the interface unit 111 or the input unit 110, the control unit 130 searches for diagnostic items corresponding to the keyword "toner" among the diagnostic items stored in the storage unit 120. According to FIG. 3, a search is performed for stored "the residual quantity of toner" and "toner characteristic" diagnostic items.

Accordingly, the control unit 130 may determine the residual quantity of toner and the toner characteristic by checking data stored in a customer replaceable unit memory (CRUM) disposed in a toner developing cartridge (not illustrated) provided inside the engine part 140 or in the system data storage unit 150. The toner characteristic information is information used to inform the user whether the presently installed toner is genuine, what characteristic the toner has, and so forth. The control unit 130 may determine whether the toner is genuine by comparing toner manufacturer information stored in the CRUM with image forming device manufacturer information or toner manufacturer information stored in the system data storage unit 150.

In addition, the control unit 130 may determine the present residual amount of toner by directly reading the toner residual information stored in the CRUM.

On the other hand, if the user desires to know the time required to print, the user may input a keyword "time". In this case, referring to FIG. 3, a search is performed for the stored "time information" and "printing speed" diagnostic items.

Accordingly, the control unit 130 may read the time information from the system data storage unit 150, and check the printing speed, i.e., the time required to print a page, by performing a self-test of the engine part 140.

In another embodiment, where an input keyword(s) is associated with a plurality of diagnostic items which are searched for, the control unit 130 may provide a list of the associated searched diagnostic items, so that the user can select one or more diagnostic items to be diagnosed. The list can be provided through the output unit 160, the engine part 140, the input unit 110, and/or the interface unit 111 in the same manner as the result of a diagnosis is provided, as described above.

From the foregoing embodiments, it may be understood that the keyword is inputted by a user through the host device 200. However, the keyword may also be inputted through the user interface unit 112 from input device 115 of the image forming device 100. That is, the user may input a diagnosis execution command by manipulating the keypad, the touch screen, and so forth, of the input device 115. In this embodiment, a user interface window to input the keyword can also be provided on the output unit 160. The user can directly input the keyword by manipulating the keypad, the touch screen, and so forth of output unit 160. The operation performed after the keyword is inputted is the same as described above.

Once the diagnosis is completed as described above, the image forming device 100 provides the result of diagnosis to the user that has inputted the keyword. That is, if the keyword is inputted through the host device 200, the image forming device provides the result of diagnosis to the host device 200 through the interface unit 111 to the user, while if the keyword is inputted from the image forming device itself, the image forming device provides the user with the result of a diagnosis through the output unit 160, the input device 115, or the engine part 140.

FIG. 4 is a flowchart illustrating a system diagnosis method according to an embodiment of the present general inventive concept. Referring to FIG. 4, if the keyword is inputted in operation S410, the diagnostic item(s) corresponding to the input keyword is searched for in operation S420. Accordingly, if the diagnostic item(s) is searched for, a diagnosis is performed with respect to the searched diagnostic item(s) in operation S430.

Figure 5:
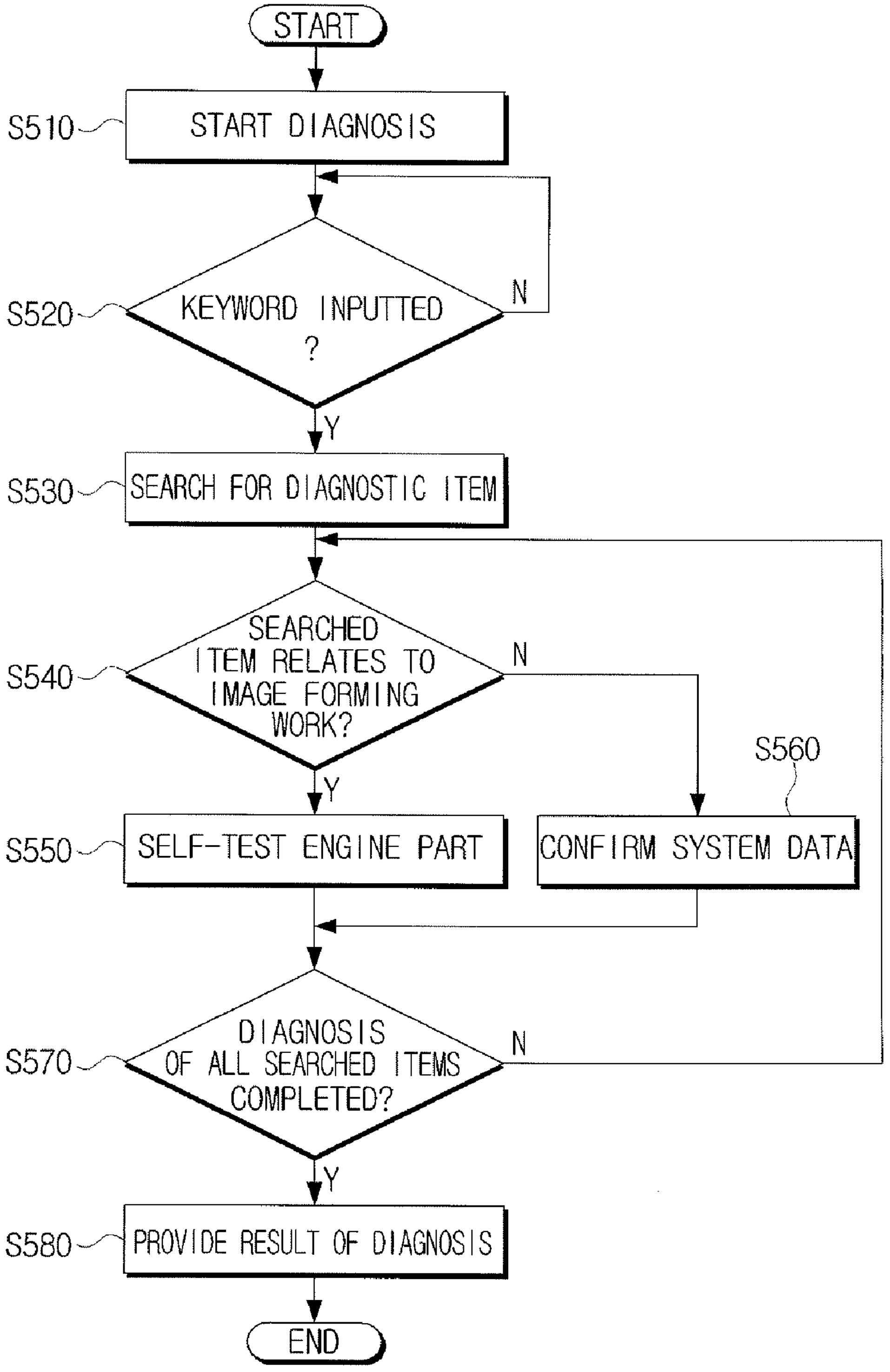
FIG. 5 is a flowchart illustrating the system diagnosis method of FIG. 4 in more detail.

FIG. 5 is a flowchart illustrating the system diagnosis method of FIG. 4 in more detail.

Referring to FIG. 5, if a keyword is inputted in operation S520 in a condition where the diagnostic program is being executed in operation S510, a diagnostic item(s) corresponding to the input keyword is searched for in operation S530. If no keyword has been inputted, the operation S520 waits for an inputted keyword.

If the diagnostic item(s) is searched for as described above, it is determined in operation S540 whether the searched item(s) relates to the image forming operation.

If it is determined in operation S540 that the diagnostic item(s) relates to the image forming operation, a diagnosis corresponding to the diagnostic item(s) is performed through a self-test of the engine part in operation S550. By contrast, if the diagnostic item(s) does not relate to the image forming operation, but relates to a non-image forming characteristic of the image forming device 100, a diagnosis is performed for each such diagnostic item by confirming the system data in operation S560.

If all searched diagnostic items associated with an inputted keyword have been searched as described above, it is determined in operation S570 whether a diagnosis has been performed with respect to all the searched diagnosis items and if not, a diagnosis is performed for each undiagnosed searched diagnosis item. Consequently, if the diagnosis is completed with respect to all the searched diagnostic items, the results of each completed diagnosis is provided to the user in operation S580. As described above, the providing of the results of diagnosis can be performed in diverse ways.

Figure 6:
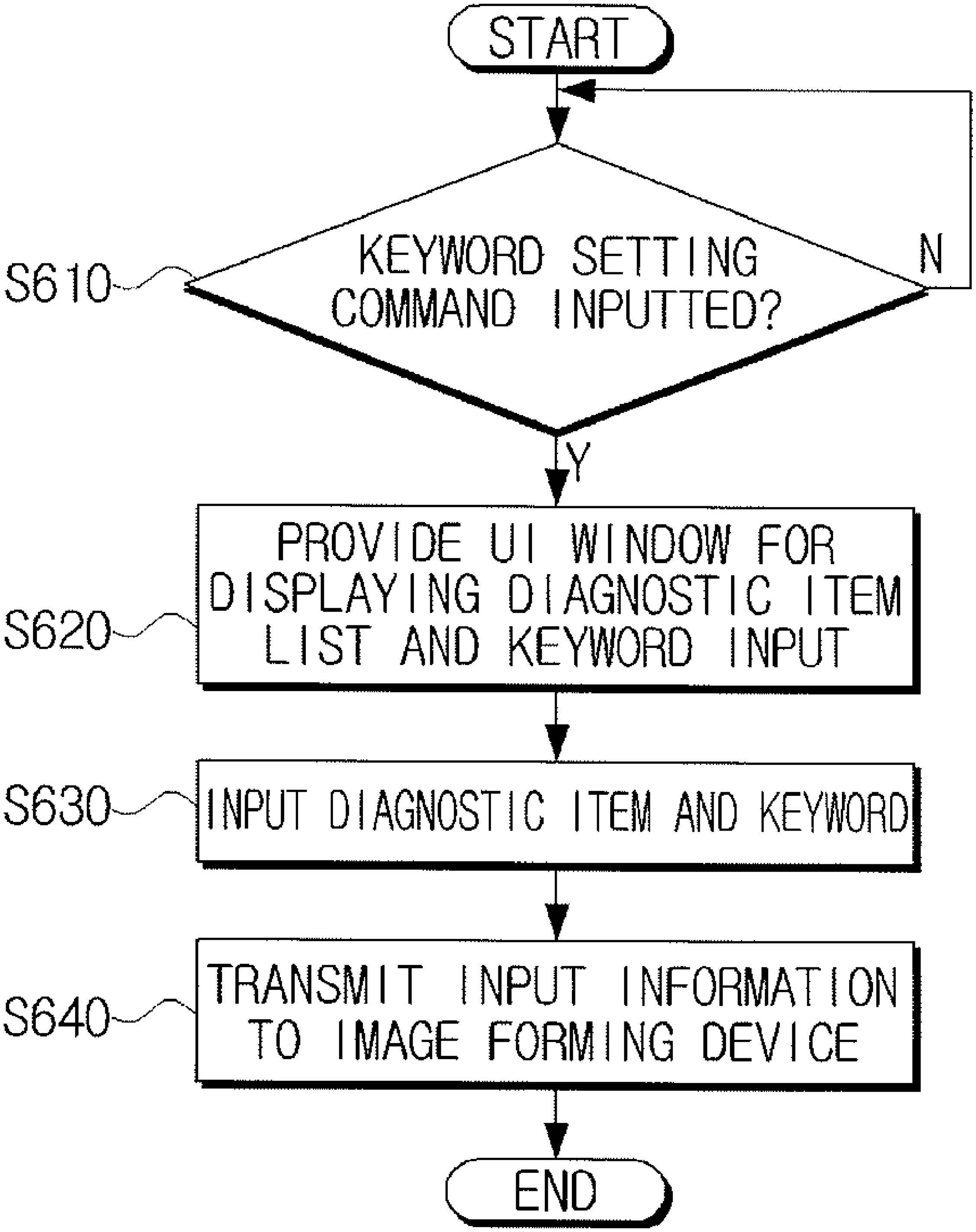
FIG. 6 is a flowchart illustrating an example of a keyword setting method.

FIG. 6 is a flowchart illustrating an example of a keyword setting method of the present general inventive concept.

Referring to FIG. 6, a user executes an application program to perform a diagnosis through the external host device 200 or input device 115, and inputs the keyword setting command in operation S610.

If the keyword setting command is inputted, a user interface window to display a keyword input region is displayed on a display of the external host computer 200 or the input device 115, together with a list of selectable diagnostic items in operation S620.

The user selects the diagnostic item using various kinds of input means (not illustrated) described above which are provided in the external host device 200 or input device 115, and inputs a keyword(s) to select one or more diagnostic item in operation S630. As described above, one or more keywords may be inputted for each diagnostic item or one keyword may be inputted for more than one diagnostic item.

If the selection of the diagnostic item and the input of the keyword are completed, the external host device 200 or input device 115 transmits the information on the selected diagnostic item and the information on the input keyword to the control unit 130 of image forming device 100 in operation S640. The image forming device 100 stores the transmitted information in storage unit 120, so that the stored information can be used for a search for the selected diagnostic item.

Although FIG. 6 illustrates the keyword setting method using the external host device 200, the keyword setting can also be performed by the image forming device 100 itself, as described above.

As described above, according to the present general inventive concept, a user can easily search for diagnostic items by inputting a keyword that may relate to the item to be diagnosed. In addition, the diagnosis can be performed by searching for a plurality of related diagnostic items at the same time. Accordingly, even a user who is not well aware of the particular method of a diagnostic program can conveniently perform a system diagnosis using simple keywords.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming device comprising:

a storage unit to store information corresponding to diagnostic items and keyword information corresponding to respective diagnostic items;

an input unit to receive an input of at least one keyword; and a control unit to search for at least one diagnostic item stored in the storage unit which corresponds to the input of the at least one keyword and to perform at least one diagnosis of the image forming device according to the searched at least one diagnostic item, wherein the control unit matches information corresponding to the at least one diagnostic item for which a keyword is to be set with set keyword information corresponding to the keyword to be set and stores in the storage unit the set keyword information which corresponds to the at least one diagnostic item matched with the keyword to be set.

2. The image forming device of claim 1, wherein the input unit comprises:

a user interface unit to receive an input of the at least one keyword;

wherein the control unit searches for the at least one diagnostic item stored in the storage unit which corresponds to the at least one keyword inputted through the user interface unit and performs the at least one diagnosis according to the searched at least one diagnostic item.

3. The image forming device of claim 1, wherein the input unit comprises:

an interface unit to receive at least one keyword transmitted from an external host device;

wherein the control unit searches for at least one diagnostic item stored in the storage unit which corresponds to the at least one keyword transmitted through the interface unit and performs at least one diagnosis according to the at least one searched diagnostic item.

4. The image forming device of claim 3, wherein the control unit transmits a result of at least one diagnosis to the external host device through the interface unit if the at least one diagnosis corresponding to the at least one diagnostic item is completed.

5. The image forming device of claim 1, further comprising:

an engine part to perform an image forming operation;

wherein, if the at least one diagnostic item corresponding to the at least one input keyword relates to an image forming operation, the control unit performs the at least one diagnosis by performing a self-test of the engine part and checking a result of the self-test.

6. The image forming device of claim 1, further comprising:

a system data storage unit to store system data;

wherein the control unit performs the at least one diagnosis by checking the system data stored in the system data storage unit if the at least one diagnostic item corresponding to the at least one input keyword relates to a characteristic of the image forming device.

7. The image forming device of claim 1, further comprising:

an output unit to output a message to report a result of the at least one diagnosis; and an engine part to perform an image forming operation and to output a printed document;

wherein the control unit outputs the result of the at least one diagnosis through at least one of the output unit and the engine part in the form of a message or a printed document if the at least one diagnosis corresponding to the at least one diagnostic item is completed.

8. The image forming device of claim 1, wherein the control unit searches for all diagnostic items having the same keyword as the at least one input keyword among the diagnostic items stored in the storage unit if the keyword is inputted and performs a diagnosis for each diagnostic item associated with the at least one input keyword.

9. The image forming device of claim 1, wherein the keyword information stored in the storage unit is editable metadata for at least one respective diagnostic item.

10. A system diagnosis method for an image forming device, comprising:

receiving an input of at least one keyword;

matching information corresponding to at least one diagnostic item for which at least one keyword is to be set with keyword set information corresponding to the at least one keyword to be set and storing the keyword set information corresponding to the at least one diagnostic item matched;

searching pre-stored information for at least one diagnostic item that corresponds to the at least one input keyword; and performing at least one diagnosis of the image forming device according to the searched pre-stored information for the at least one corresponding diagnostic item.

11. The system diagnosis method of claim 10, wherein the performing of the at least one diagnosis includes performing a self-test of an engine part of the image forming device to perform an image forming operation if the at least one searched diagnostic item relates to the image forming operation and checking a result of the self-test.

12. The system diagnosis method of claim 10, wherein the performing of the at least one diagnosis includes confirming pre-stored system data if the at least one searched diagnostic item relates to a characteristic of the image forming device.

13. The system diagnosis method of claim 10, further comprising:

outputting a result of the at least one diagnosis in the form of a printed document or a message if the at least one diagnosis is completed.

14. The system diagnosis method of claim 10, further comprising:

transmitting a result of the at least one diagnosis to an external host device if the at least one diagnosis is completed.

15. The system diagnosis method of claim 10, wherein:

the searching of the pre-stored information for at least one diagnostic item comprises searching for all the diagnostic items having the same keyword as the input keyword among the pre-stored information for at least one diagnostic item; and the performing at least one diagnosis comprises, if all the diagnostic items have been searched for, performing the at least one diagnosis corresponding to the searched at least one diagnostic item.

16. The system diagnosis method of claim 10, wherein:

the searching of the pre-stored information comprises searching for all the diagnostic items having the same keyword as the input keyword among the pre-stored information for at least one diagnostic item; and the performing of the at least one diagnosis comprises, if all the diagnostic items have been searched for, providing a list of all the searched diagnostic items and performing at least one diagnosis corresponding to each diagnostic item selected from the list.

17. The system diagnosis method of claim 10, wherein the pre-stored information is editable metadata for the respective diagnostic items.

18. The system diagnosis method of claim 10, wherein the receiving an input of at least one keyword includes receiving the at least one keyword from at least one of an input device provided in the image forming device and an external host device.

19. An image forming device, comprising:

a storage unit to store information including one or more diagnostic items and one or more keywords to designate each of the one or more diagnostic items; and a control unit to select at least one of the one or more diagnostic items according to an input of at least one of the one or more keywords to perform a diagnosis corresponding to the selected at least one diagnostic item, wherein the control unit matches information corresponding to the at least one diagnostic item for which a keyword is to be set with set keyword information corresponding to the keyword to be set and stores in the storage unit the set keyword information which corresponds to the at least one diagnostic item matched with the keyword to be set.

20. An image forming device, comprising:

a storage unit to store information including a first diagnostic item, a second diagnostic item, a plurality of keywords to designate the first diagnostic item, and a single keyword to designate the second diagnostic item; and a control unit to perform a diagnosis corresponding to the first diagnostic item according to any one of the keywords and to perform another diagnosis corresponding to the second diagnostic item according to a single keyword, wherein the control unit matches information corresponding to the first diagnostic item for which a keyword is to be set with set keyword information corresponding to the plurality of keywords to be set and stores in the storage unit the set keyword information which corresponds to the first diagnostic item matched with the plurality of keywords to be set, and the control unit matches information corresponding to the second diagnostic item for which a keyword is to be set with set keyword information corresponding to the single keyword to be set and stores the set keyword information which corresponds to the second diagnostic item matched with the single keyword to be set in the storage unit.

* * * * *